(12) United States Patent
Kammerer et al.

(10) Patent No.: US 8,683,040 B2
(45) Date of Patent: Mar. 25, 2014

(54) INTERMEDIARY NODE WITH DISTRIBUTION CAPABILITY AND COMMUNICATION NETWORK WITH FEDERATED METERING CAPABILITY

(75) Inventors: Kurt Kammerer, Huefingen (DE); Volker Schmid, Blumberg (DE)

(73) Assignee: regify S.A., Luxembourg (LU)

( * ) Notice: Subject to any disclaimer, the term of this patent is extended or adjusted under 35 U.S.C. 154(b) by 150 days.

(21) Appl. No.: 13/334,078

(22) Filed: Dec. 22, 2011

(65) Prior Publication Data

US 2012/0173663 A1    Jul. 5, 2012

Related U.S. Application Data

(60) Provisional application No. 61/428,897, filed on Dec. 31, 2010.

(51) Int. Cl.
  *G06F 13/00*  (2006.01)
(52) U.S. Cl.
  USPC ............................ 709/225; 709/219; 709/250
(58) Field of Classification Search
  USPC ........................ 709/217, 219, 223, 225, 250
  See application file for complete search history.

(56) References Cited

U.S. PATENT DOCUMENTS

| | | | |
|---|---|---|---|
| 6,266,704 B1 | 7/2001 | Reed et al. | |
| 7,080,158 B1 * | 7/2006 | Squire | 709/245 |
| 7,146,505 B1 * | 12/2006 | Harada et al. | 713/185 |
| 7,472,093 B2 * | 12/2008 | Juels | 705/80 |
| 8,301,787 B2 * | 10/2012 | Li | 709/229 |
| 2002/0152326 A1 | 10/2002 | Orshan | |
| 2003/0023142 A1 | 1/2003 | Grabover et al. | 600/143 |
| 2006/0023727 A1 | 2/2006 | George et al. | |
| 2006/0095787 A1 * | 5/2006 | Aaron | 713/184 |
| 2008/0244718 A1 | 10/2008 | Frost et al. | |
| 2009/0172171 A1 | 7/2009 | Amir | |
| 2011/0295069 A1 | 12/2011 | Ouchi | 600/146 |
| 2012/0209942 A1 * | 8/2012 | Zehavi et al. | 709/213 |

FOREIGN PATENT DOCUMENTS

| | | |
|---|---|---|
| EP | 2103247 A1 | 9/2009 |
| WO | WO-94/10897 A1 | 5/1994 |
| WO | 03/055175 A1 | 7/2003 |

OTHER PUBLICATIONS

Apr. 29, 2013 Examination Report for related application EP 11 193 879.1.
Mar. 23, 2012 extended European search report for related application EP 11 193 879.1.

* cited by examiner

*Primary Examiner* — Viet Vu
(74) *Attorney, Agent, or Firm* — Clifford Perry

(57) ABSTRACT

An intermediary node (105) comprises a first control node communication module (151) adapted for forming a first communication network (152) with a first control node (101); a second control node communication module (153) adapted for forming a second communication network (154) with a second control node (103), wherein the first communication network is communicatively separated from the second communication network; and a user node communication module (155) adapted for forming a user communication network (127) with at least one first user node (109) and for receiving a user request (141) from the first user node, wherein the intermediary node (105) is adapted to generate an anonymous user request (143) based on the user request and to perform a selection to transmit the anonymous user request selectively to the first control node (101) or to the second control node (103).

19 Claims, 7 Drawing Sheets

INTERMEDIARY NODE WITH DISTRIBUTION CAPABILITY AND COMMUNICATION NETWORK WITH FEDERATED METERING CAPABILITY

FIELD OF THE INVENTION

The present invention relates to an intermediary node, to a communication network, to a communication method, to a program element and to a computer-readable medium. In particular, the present invention relates to an intermediary node, to a communication network, to a communication method, to a program element and to a computer-readable medium, wherein the intermediary node is adapted to selectively communicate with a first control node or a second control node which serve different kinds of response data.

BACKGROUND OF THE INVENTION

E-commerce and transactions of all kinds require communication that is secure and indisputable. In case electronic communication is used to effect such transactions, confidentiality, identification of sender/recipient and message integrity of such communication must be ensured electronically, and relevant communication events must be registered in a non-repudiation protocol for reasons of traceability. Legal and business demands must be satisfied, and data privacy as defined by applicable law or by individual users or user groups must be maintained at the same time. Examples for such transactions can be the transmission of e-invoices, the management of purchasing transactions or the execution of digital postal services, such as trusted and binding e-mail. Challenges are manifold and may be met using embodiments of the invention, in particular by adopting a new flexible architectural approach with innovative technical processes according to embodiments of the invention.

WO 2007073943 A1 discloses a communication system comprising a sender unit, a recipient unit and a control unit, wherein the sender unit is adapted to generate an electronic message, to send the electronic message directly to the recipient unit, and to send a sending information message to the control unit indicating that the sender unit has sent the electronic message to the recipient unit, wherein the recipient unit is adapted to receive the electronic message directly from the sender unit and to send a receipt information message to the control unit, the receipt information message indicating that a user of the recipient unit has received the electronic message.

WO 2007073943 A1 furthermore discloses that a provider may communicate with the sender unit in a manner that the provider knows the identity of a user of the sender unit. However, in contrast to this, a communication between the first control entity and the second control entity regarding the sender unit may be anonymous so that the identity of the sender unit will not be known to the second control entity.

There may be a need for an intermediary node, for a communication network, for a communication method, for a program element and for a computer-readable medium which allow data communication with a high degree of data security, wherein in particular protection of sensible data may be improved, in particular satisfying local regulations. Data security may be the practice of keeping data protected from corruption and unauthorized access. The focus behind data security may be to ensure privacy while protecting personal or corporate data.

To meet the above need an intermediary node, a communication system comprising the intermediary node, a communication method, a program element and a computer-readable medium according to the independent claims are provided.

SUMMARY OF THE INVENTION

According to an embodiment of the present invention, an intermediary node (such as a computer, a computer cluster, a network computer, a notebook, a mobile phone) is provided, wherein the intermediary node comprises a first control node communication module (in particular allowing setting up a communication channel, such as by providing a communication interface) adapted for forming a first communication network (which may comprise a wire-based network or/and a wireless communication network, in particular a private communication network) with a first control node (in particular comprising one or more computers, such as server computers or comprising a cluster of computers); a second node communication module (in particular allowing establishing a second communication channel by providing an interface) for forming a second communication network (in particular a private communication network which may be wire-based and/or wireless) with a second control node (in particular comprising one or more computers, such as server computers), wherein the first communication network is communicatively separated from the second communication network (such that no communication or data exchange between the first control node and the second control node may be performed via the intermediary node); and a user node communication module (in particular allowing establishing a communication channel by providing an interface) adapted for forming a user communication network (which may be wire-based and/or wireless-based, in particular being a public communication network, such as the internet) with at least one first user node (which may comprise one or more computers, such as a notebook, a desktop computer and/or a phone, in particular a mobile phone) and adapted for receiving a user request (in particular comprising electrical or electronic signals, in particular analogue electric signals and/or digital electric signals, the signal representing in particular a data structure and adhere to a particular communication protocol, such as ftp, tcp/ip or http) from the first user node. In particular, the user request may be received in a encrypted form. In particular, the user request may be received in a non-encrypted form. In particular, the user request may comprise a digital fingerprint of content data which were received by the first user node previously (via a further communication channel or data transfer process).

Herein a digital fingerprint of content data may comprise a hashcode of the content data, a checksum of the content data, a general user id (GUID) and the like.

Thereby, the intermediary node is adapted to generate (such as by using a processor and/or software) an anonymous user request (which does not allow obtaining the identity of the first user node, wherein the anonymous user request may for example comprise a digital fingerprint (in particular a hash-code) of the identity of the first user node or/and a digital fingerprint (such as a hashcode or checksum) of any data indicative of the identity of the first user node or indicative of a user employing the first user node for data communication) based on the user request (such that the user request or a data structure representing the user request is transformed or modified in order to derive the anonymous user request therefrom, such as by using a decryption technique (in case the user request is in encrypted form), or by forming a digital fingerprint (in particular a hashcode or a checksum) of particular data items comprised in the user request) and to perform a selection (based on the user request or taking into account the user request) to transmit the anonymous user request selectively to the first control node or to the second control node.

In particular, after performing the selection, the anonymous user request may be transmitted to the selected control node, i.e. to the first control node or to the second control node. In particular, the intermediary node is adapted to selectively transmit the anonymous user request to the first control node or to the second control node, wherein the selection may be based on a default setting at the intermediary node, may be based on information comprised within the user request, may be based for example on a geographical location of the first user node or a geographical location of a user employing the first user node and may in particular be based on different capabilities or functionalities offered by the first control node and the second control node.

In particular, the user request may ask for a particular kind of response data, wherein this kind of response data may be available only on or at one of the first control node and the second control node. In particular, a particular kind of response data may be sensitive data which may be required to be kept only at the first control node, wherein it may be required to be ensured that these particular kind of response data will not be made accessible to the second control node or any other third party. In particular, the requested response data may comprise data to decrypt content data received previously by the first user node. In particular, the response data may comprise one or more decryption keys for decrypting content data previously received by the first user node in an encrypted form.

According to an embodiment, the intermediary node further comprises a determining section (such as a hardware module and/or a software module or program portion) to determine (in particular comprising analyzing the user request, such as by reading the user request and/or extracting particular data items or parameters from the user request), whether the user request relates to a first transaction type (describing a type of a transaction which has been performed by the first user node or performed by a user employing the first user node) or to a second transaction type, wherein the selection to transmit the anonymous user request to the first control node or to the second control node depends on (or may be based on), whether the user request relates to the first transaction type or to the second transaction type.

In particular, the first control node may maintain, store or keep data related to first transactions performed by the first user node, wherein these first transactions are of the first transaction type. For example, the first transactions may comprise transmission of emails and/or providing content data in any way to the first user node. In particular, the emails and/or the content data may have been provided or transmitted to the first user node in an encrypted form and the first control node may store or maintain one or more decryption keys (in particular in an encrypted form) for decrypting the encrypted emails or decrypting the encrypted content data. In particular, the second control node may store or maintain data (in particular decryption keys) which are required to decrypt other data involving performing second transactions of the second transaction type. Second transactions may for example comprise payment transactions, such as electronic payment transactions. In particular, second transactions may also comprise orders to buy or sell shares or other value papers. Further, the second transactions may comprise bank transfer transactions or the like. In particular the transaction type may also be based on geographical information relating to the first user node, to the first control node and/or to the second control node.

Depending on the transaction type the one or more keys which are required to decrypt data related to the transactions may be required to be maintained or stored at a particular control node, i.e. at the first control node or the second control node, but may be required not to be accessed by any other control node. In particular, the user request may be indicative of the transaction type, such as when the user request comprises a data item or a parameter allowing to determine the transaction type. Thereby, the distribution of the anonymous user request to the first control node or to the second control node may be simplified.

According to an embodiment, the intermediary node further comprises a storage (such as an electronic storage, a RAM, a harddisk or the like) storing a mapping table (such as a two-dimensional table, a three-dimensional table, a list of pairs, a hash table or any other suitable data structure allowing to define multiple associations) indicating an association of the first transaction type with the first control node (such as indicating that when the user request indicates that it relates to the first transaction type the anonymous user request is to be transmitted to the first control node) and indicating an association of the second transaction type with the second control node, wherein the selection is based on the mapping table.

Thus, according to an embodiment, the intermediary node may have information available at its storage, the information being indicative to which control node the anonymous user request is to be transmitted after the intermediary node has determined the transaction type associated with the user request. Such kind of mapping table or predetermined association of transaction type and particular control node may also be considered as a default setting for determining a destination control node, when a user request indicative of a particular transaction type is received at the intermediary node. In particular, according to an embodiment, the intermediary node alone determines to which control node a particular anonymous user request is to be transmitted. According to this embodiment, the first user node has no direct influence on the selection where to forward the anonymous user request. In other embodiments, the first user node, in particular a geographical location of the first user node and/or a jurisdiction or political country of the first user node may influence the selection performed by the intermediary node to transmit the anonymous user request selectively to the first control node or to the second control node. In particular, the first user node may be mobile, thus adapted to change its geographical location.

In embodiments, the first control node, in particular a geographical location of the first control node and/or second control node and/or a jurisdiction or political country of the first control node and/or second control node may influence the selection performed by the intermediary node to transmit the anonymous user request selectively to the first control node or to the second control node.

According to an embodiment of the intermediary node, the selection to transmit the anonymous user request to the first control node or to the second control node depends on destination control node data (in particular data indicating a particular control node as a destination of the anonymous user request) comprised in the user request (in that for example the user request comprises a particular data item or parameter defining or being indicative of a destination control node), the destination control node data being indicative of a destination control node of the anonymous user request. In particular, the first user node may have provided the destination control node data in order to influence the selection of the first control node or the second control node and/or in order to overrule a possible default setting maintained at the intermediary node. In particular, according to an embodiment, the first user node may exclusively or alone determine to which control node the anonymous user request will be transmitted. Thereby, a great flexibility may be achieved and in particular the first user node may have full control over the data flow of his user request and his anonymous user request (nevertheless the addressed control node may deny providing the response data). Thus, it may be avoided that sensitive data comprised in the user request or comprised in the anonymous user request may be forwarded or transmitted to a control node which must not receive the anonymous user request. Thereby, data security may be improved.

According to an embodiment of the intermediary node, the selection (to transmit the anonymous user request to the first control node or to the second control node) is based on a geographical (a location on the earth) and/or political location (a location in a particular political country or jurisdiction) of the first control node and/or on a geographical and/or political location of the second control node. Thereby, data confidential within a particular geographical region or confidential within a political country or a particular political region may be kept within this geographical and/or political region, in particular to improve data security. Further, according to an embodiment, the selection may be based additionally on a geographical and/or political location of the first user node or a geographical and/or political location of a user employing the first user node. Thus, in this case, information indicative of the geographical and/or political location of the first user node or data indicative of a geographical and/or political location of a user employing the first user node may be comprised within the user request or may at least be derivable by the intermediary node upon receiving the user request from the first user node, such as by analysing an (Internet) address of the first user node.

According to an embodiment of the intermediary node, the first control node communication module is further adapted to receive anonymous response data (the anonymous response data not allowing to determine the identity of the first user node or the identity of a user employing the first user node) from the first control node, wherein the second control node communication module is adapted to receive anonymous response data from the second control node, wherein the anonymous response data are indicative of a response to the user request. In particular, the anonymous response data may comprise, as explained above, one or more decryption keys required for decrypting content data or any other data previously received by the first user node in any way in particular not involving data transmissions via the intermediary node, the first control node or the second control node. Thereby, the required data to decrypt the content data received by the first user node may be received by the intermediary node and may in particular be transmitted to the first user node. Thereby, the first user node is enabled to decrypt the content data previously received via any other communication channel.

According to an embodiment of the intermediary node, the intermediary node is adapted to derive response data based on the received anonymous response data, wherein the user node communication module is adapted to transmit the response data to the first user node. Thereby, the first user node may receive the response data which may allow to decrypt content data which were previously received by the first user node in an encrypted form.

According to an embodiment of the intermediary node, the generated anonymous user request comprises a digital fingerprint (in particular a hash-code) of an identification information of the first user node. The hashcode may be derived using a cryptographic hash function which may calculate a pseudo-unambiguous checksum for arbitrary data, such as for the identification information of the first user node. In particular, the cryptographic hash function does not provide an inverse function, such that from the hashcode of the identification information of the first user node the identification information of the first user node may not be derivable in any way. Thereby, data security and safety may be improved. Nonetheless, the digital fingerprint (in particular the hashcode) of the identification information of the first user node may be used as an anonymous identification of the first user node. Thereby, querying for the anonymous response data at the first control node or at the second control node may be performed by searching for the digital fingerprint (in particular the hashcode) of the identification information of the first user node in a storage of the first control node or the second control node, wherein in this control node storage the anonymous response data are stored, in particular associated with the digital fingerprint (in particular the hashcode) of the identification information of the first user node.

According to an embodiment of the intermediary node, the generated anonymous user request comprises a digital fingerprint (in particular a hash-code) of a transaction identification information identifying a transaction performed by the first user node. In particular, as a cryptographical hash function the well-known SHA-256 function may be employed which calculates from arbitrary data a 256-bit value representing the digital fingerprint (in particular a hashcode) of the employed data. Including also the digital finger-print (in particular a hashcode) of the transaction identification information in the anonymous user request may facilitate querying for the anonymous response data at the first control node or at the second control node. In other embodiments other data may be included in the anonymous user request which may enable or facilitate querying for the anonymous response data.

According to an embodiment of the intermediary node, the transaction involves an access to content data by the first user node, wherein in particular the content data comprise at least one of payment data, email data, content on demand data, video data and audio data. In particular, the transaction may comprise transmitting the content data and/or providing content data at a particular internet website. Alternatively, the transaction may comprise providing a data storage medium to the first user node, wherein on the data storage medium the content data are stored. Further, the content data may be provided to the first user node in a printed form. In particular, the transaction may have been performed before the user request is transmitted from the first user node to the intermediary node. In particular, the transaction may involve transmission of the content data via any transmission method not involving transmission of the content data via the intermediary node or via the first control node or the second control node. Thus, gaining access to the content data (which may be provided in particular in encrypted form) may be completely separate and independent of the transmission of the user request or the reception of the response data responding to the user request. Thereby, in particular handling of one or more decryption keys may be separated from handling, transfer or transmission of content data. In particular, content data may be voluminous and may require high transfer rates for transmission, while the user request and/or the response data may comprise relatively small data amounts. In particular, a transfer rate for transmitting the content data may be much higher, such as 10 times to 100 times higher, than a transfer rate of a transfer of or a transmission of the user request and/or of the response data. Thereby, simultaneously, data security may be improved and data transfer times for transferring the content data may be optimized using a second channel.

According to an embodiment of the intermediary node, the selection to transmit the anonymous user request to the first control node or to the second control node is based on a geographical location from where the content data originate and/or is based on a geographical location where the content data are supplied to. In particular, gaining access to the content data by the first user node may require a payment by the first user node to the supplier of the content data, such as may require a payment to a second user node. In particular, the second user node may charge the first user node for the access to the content data. Further the charge or the fee to be paid by the first user node for the received content data may be taxed according to local regulations or may be subject to other specific treatment, such as based on a geographical location and/or on a political location of the consumption of the content data and/or of the production of the content data. In particular, therefore, the user request may comprise data indicative of the geographical location from where the content data originated or where the content data were produced and/or may comprise data indicative on a geographical location where the content data were supplied to, in particular the geographical location of the first user node or the geographical location of a user employing the first user node. Thereby, national, European, American, African, Asian and/or international tax treaties may be adhered to or may be satisfied or supported, as well as other regulations.

According to an embodiment of the intermediary node, the transaction involves running an application (such as a computer program, in particular a computer program involving networking with one or more computers in particular in the Internet) by the first user node (or a user of the first user node, such as a person operating the first user node), wherein in particular the application comprises at least one of an email application, a payment application, and a data access application. Further, the application may comprise a share transaction or money transfer application. Thereby, the applicability of the intermediary node may be extended. In particular, the application and/or the content data may relate to exchange of any confidential data.

According to an embodiment of the intermediary node, the intermediary node is further adapted to obtain a transaction history report indicative of a history of transaction performed by the first user node (or specific for one or more users or persons employing the first user node, wherein the plural person may be identified by person identifiers), wherein the transaction history report is specific for the first user node (or is specific for one of the users of the first user node or a particular group of users or persons using or employing the first user node). In particular, the transaction history (report) may list transactions performed by the first user node or transactions performed by a user of the first user node. In particular, the transaction history (or the transaction history report) may comprise transactions of several different transaction types, such as a first transaction type and a second transaction type. In particular, the intermediary node may be adapted to maintain the transaction history report (or at least data indicative of the transaction history report or the transaction history) in a transaction history storage comprised in the intermediary node, according to an embodiment.

In particular, each time a user request is transmitted from the first user node to the intermediary node the intermediary node may extract information regarding the transaction being related to the user request and may save or store this transaction related information in the transaction history storage. Alternatively, the intermediary node may not keep or maintain or store the transaction history in a storage, but may assemble the transaction history (report) after receiving the required information from the first control node and/or from the second control node or even further control nodes.

According to an embodiment of the intermediary node, obtaining the transaction history involves transmitting a (transaction) history request to at least one of the first control node and the second control node (wherein in particular the history request comprises an anonymous identification information identifying the first user node in an anonymous way) and receiving a (transaction) history response from at least one of the first control node and the second control node, wherein the history request comprises an anonymous first user node identification. In particular, the first control node may transmit only history data relating to the first transaction type and the second control node may only provide history information regarding the second transaction type. In one embodiment the first control node may provide history information regarding any transaction type. In particular, the first control node and/or the second control node may be adapted to store the history information in respective storages or databases comprised in the first control node and the second control node, respectively. Thereby, data management and data storage requirements of the intermediary node may be reduced.

According to an embodiment of the intermediary node, the intermediary node is further adapted to generate, based on the transaction history report, a usage message or consolidated history report (including in particular transaction information of all transactions performed by the first user node, in particular performed over a particular time period, such as one week, one month or one year, wherein the history report in particular may comprise history data regarding transactions of different types), in particular an invoice message, wherein the user node communication module is adapted to transmit the generated consolidated history report (or the invoice message) to the first user node. Thus, the intermediary node may be adapted to collect all transaction-related data and/or may be adapted to maintain all transaction-related data. In particular, the intermediary node may provide one face to the first user node which may perform different kinds of transactions, but which may receive the consolidated history report, in particular the invoice message, from only one intermediary node, thus simplifying in particular billing the first user node and maintaining privacy as no other nodes except for the intermediary node have knowledge about the identity of the user node.

It should be understood that features (individually or in any combination) disclosed, described, employed or applied to an embodiment of the intermediary node may also (individually or in any combination) be applied, used for or employed for a communication network, a communication method or any described embodiment thereof and vice versa.

According to an embodiment, an intermediary node, in particular an embodiment of the intermediary node described above is provided, wherein the intermediary node comprises a first control node communication module adapted for forming a first communication network with a first control node and comprises a second control node communication module for forming a second communication network with a second control node, wherein the first communication network is communicatively separated from the second communication network; and a user node communication module adapted for forming a communication network with at least one second user node (in particular a supplier of content data) and for receiving transaction-related data from the second user node.

In particular, the second user node may be further adapted to provide access to content data to the first user node, wherein providing the access to the content data may be performed within the transaction. In particular, upon providing access to the content data to the first user node, thus performing at least a portion of the transaction, the transaction-related data may be transmitted from the second user node to the intermediary node. In particular, the intermediary node receiving the transaction-related data may be the same intermediary node which later on receives the user request from the first user node. In alternative embodiments, the user request by the first user node may be transmitted from the first user node to a first intermediary node, while the transaction-related data may be transmitted from the second user node to a second intermediary node, wherein the second intermediary node is different from the first intermediary node.

The transaction-related data transmitted from the second user node (such as a supplier of content data, such as a computer, a computer cluster, a web portal, a website) may comprise information indicative of a transaction type defining the type of the transaction being performed by the second user node and/or by the first user node and/or between the second user node and the first user node. In particular, depending on the transaction type extracted from the transaction-related data transmitted from the second user node to the intermediary node, the intermediary node determines, whether the intermediary node transmits the anonymous transaction-related data to the first control node or to the second control node. In particular, the selection may be based on default settings maintained at the intermediary node, may depend on information comprised in the transaction-related data being explicitly set by the second user node and/or may depend on other criteria, such as the one mentioned above regarding the selection to transmit the anonymous user request selectively to the first control node or to the second control node, wherein the anonymous user request is based on a user request transmitted from the first user node to the intermediary node (in particular to the first intermediary node). Thus, also the intermediary node receiving transaction-related data may be adapted to distribute the anonymous transaction-related data to a particular one of the first control node and the second control node. Thereby, it may be ensured that sensitive or confidential data may be kept at a particular control node, avoiding that any other control node may gain access to the sensitive data.

According to an embodiment, a communication network is provided, which comprises an intermediary node according to an embodiment as described above; a first control node forming the first communication network with the intermediary node; and a second control node forming the second communication network with the intermediary node. Thereby, at least one of the first control node and the second control node is adapted to transmit an anonymous transaction history response specific for the first user node (or specific for one or more users or person employing or using the first user node) to the intermediary node. In particular, at least one of the first control node and the second control node may be adapted to perform a metering of transactions (in particular each performing a metering of transaction of a particular transaction type). In particular metering data may be included in the anonymous transaction history response. In particular the metering may comprise determining data amount of the content data transferred during the transactions, time required to transfer the content data or the like.

The metering is in particular performed in an anonymous manner. However, the metering or the anonymous transaction history response may be specific for a plurality of first user nodes located within a particular geographical region or located within a particular jurisdiction, such as a particular political country. Thereby, inter-country tax regulations or treaties may be supported.

According to an embodiment of the communication system, the first control node is located at a first control node location and the second control node is located at a second control node location, wherein the first control node location is spaced apart from the second control node location by a distance between 10 km and 20000 km, in particular between 300 km and 20000 km. Thus, the first control node and the second control node may be placed all over the world. In particular, the first control node and/or the second control node may be mobile, such that they may change their geographical location(s).

According to an embodiment, the first control node location is within a first jurisdiction region and the second control node location is within a second jurisdiction region different from the first jurisdiction region. In particular, the first control node location is within a first political country and the second control node location is within a second political country or political community of political countries.

According to an embodiment of the communication system, the communication system further comprises a further first control node forming a first control node communication network with the first control node (wherein in particular a plurality of further first control nodes may be provided, wherein each of the plurality of the further first control nodes may form a respective control node communication network, wherein all control node communication networks may be mutually independent and separate from each other), wherein the first control node is adapted to transmit the anonymous user request received from the intermediary node to the further first control node, if the anonymous response data (responding to the anonymous user request) are not available at the first control node (for example, the anonymous response data may be sensitive or confidential data which may not be maintained at the first control node, but may be maintained at the further first control node), wherein the further first control node is adapted to retrieve the anonymous response data (in particular from a storage comprised in the further first control node) and transmit the anonymous response data to the first control node via the first control node communication network, wherein the first control node is adapted to transmit the anonymous response data received from the further first control node to the intermediary node. Thereby, it is possible to maintain or store confidential or sensitive data at the further first control node without requiring that these sensitive data are stored at the first control node. Further, the intermediary node may be adapted to transmit response data derived from the anonymous response data to the first user node.

According to an embodiment of the communication system, the communication system further comprises a further second control node forming a second control node communication network with the second control node (wherein in particular a plurality of further second control nodes may be provided, wherein each of the plurality of the further second control nodes may form a respective control node communication network, wherein all control node communication networks may be mutually independent and separate from each other), wherein the second control node is adapted to transmit the anonymous user request received from the intermediary node to the further second control node, if the anonymous response data (responding to the anonymous user request) are not available at the second control node.

According to an embodiment of the communication system, the further first control node is adapted to transmit a denial message to the first control node, if an access condition for accessing the anonymous response data at the further first control node is not satisfied. In particular, at the further first control node anonymous transaction-related data may be stored which relate to a transaction performed by the second user node, the first user node or related to a transaction between (or involving) the second user node and the first user node. Depending on the transaction type or the particular transaction the transaction-related data may be tagged as confidential to a particular control node, such as the further first control node. Such tagging may be performed at the second user node or may be performed at the intermediary node or may be performed at the further first control node (thus, at the control node level, at the intermediary node level or at the user node level). Thereby, data security may further be improved. The access condition may comprise one or more access criteria which may be defined at the user node level, at the intermediary node level or/and at the control node level. Thereby, large flexibility for securing sensitive data may be provided.

According to an embodiment of the communication system, the first control node and the intermediary node are adapted to transmit data indicative of the denial message to the first user node. In particular in this case, no data are transmitted to the first user node from the intermediary node, which data could be used to decrypt the content data.

According to an embodiment of the communication system, the first control node is adapted to collect anonymous transaction history data from the further first control node for assembling the anonymous transaction history response. In particular, when a plurality of further first control nodes is provided forming a plurality of first control node communication networks with the first control node, the first control node may be adapted to collect anonymous transaction history data from the plurality of further first control nodes for assembling the anonymous transaction history response. Alternatively or additionally the transaction history response may be assembled or collected from the intermediary node from the plurality of further first control nodes.

According to an embodiment at least one of the first control node, further first control node, the second control node, the intermediary node, the first user node and the second user node comprises at least one of the group consisting of a server computer, a client computer, a desktop computer, a laptop computer, a personal digital assistant, and a mobile phone.

According to an embodiment, a communication method is provided, comprising: providing an intermediary node; receiving, by a user node communication module of the intermediary node via a communication network formed between the intermediary node and at least one first user node, a user request from the first user node; generating, by an intermediary node, an anonymous user request based on the user request; and performing, by an intermediary node, a selection to transmit the anonymous user request selectively to a first control node or to a second control node, wherein a first control node communication module of the intermediary node forms a first communication network with the first control node and wherein a second control node communication module of the intermediary node forms a second communication network with the second control node, wherein the first communication network is communicatively separated from the second communication network.

According to an embodiment, a program element and a computer-readable medium are provided, wherein the program element or a computer program stored on the computer-readable medium, when being executed by a processor, is adapted to control or carry out a communication method according to an embodiment as described above.

Similar elements or components in the illustrated embodiments, findings by the inventors or comparative examples are labelled by the same reference signs differing only in the first digit. It should be understood that features disclosed in the context of findings and/or considerations by the inventor may also be (individually or in any combination) applied to embodiments of the present invention and the features disclosed in the context one embodiment of the present invention may (individually or in any combination) also be applied to another embodiment of the present invention.

DETAILED DESCRIPTION OF EMBODIMENTS OF THE INVENTION AND FINDINGS BY THE INVENTORS

Figure 1:
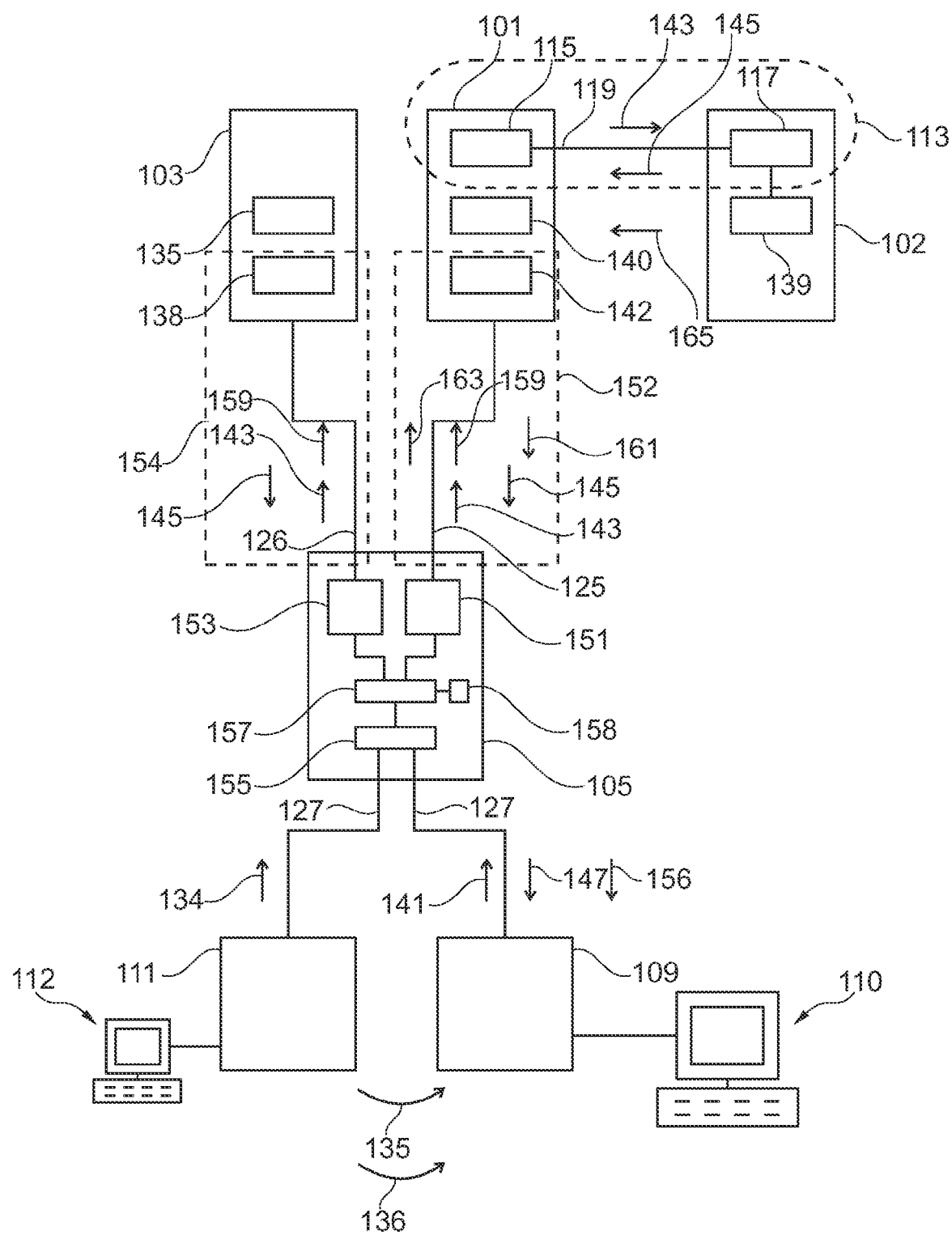
FIG. 1 schematically illustrates a communication network according to an embodiment comprising an intermediary node according to an embodiment and performing a communication method according to an embodiment.

FIG. 1 schematically illustrates a communication network 100 according to an embodiment. The communication network 100 is a computer communication network comprising an intermediary node 105, a first user node 109, a second user node 111, a first control node 101 and a second control node 103. In other embodiments, the communication network 100 only comprises the intermediary node 105, the first control node 101 and the second control node 103. According to another embodiment, the intermediary node 105 alone is provided.

The intermediary node 105 comprises a first control node communication module 151 which is adapted for forming a first communication network 152 with the first control node 101, the first control node 101 using the intermediary node communication module 142. In particular, the first communication network 152 allows data transmission between the first control node 101 and the intermediary node 105 via the communication channel 125.

Further, the intermediary node 105 comprises a second control node communication module 153 which is adapted for forming a second communication network 154 with the second control node 103, the second control node 103 using a intermediary node communication module 138. In particular, the first communication network 152 and the second communication network 154 are communicatively separated and independent from each other such that in particular the first control node 101 and the second control node 103 are not able to communicate with each other via the intermediary node 105. In particular, the first communication network 152 and the second communication network 154 are private networks, in particular virtual private networks (VPN).

Further, the intermediary node 105 comprises a user node communication module 155 for forming a user communication network via the data channel 127 to the first user node 109. The first user node 109 may for example comprise one or more computers, such as a notebook computer, a desktop computer comprising a monitor and a keyboard as indicated by reference number 110.

The first user node 109 is adapted to transmit a user request 141 via the communication channel 127 to the user node communication module 155. The intermediary node 105 is adapted to generate, based on the user request 141, an anonymous user request 143. Further, the intermediary node 105 is enabled to perform a selection for transmission of the anonymous user request 143 selectively either to the first control node 101 or to the second control node 103. In particular, the selection may be based on data comprised in the user request 141, may depend on a mapping table stored in a storage 157 of the intermediary node, may depend on a geographical location of the first user node 109, and/or may depend on geographical locations of the first control node 101 and the second control node 103.

In particular, depending on a transaction type derived from the user request 141, the intermediary node 105 determines to which control node of the first control node 101 and the second control node 103 the anonymous user request 143 is to be sent.

According to an embodiment, the anonymous user request 143 is transmitted from the intermediary node 105 within the first communication network 152 to the first control node 101. The first control node 101 is adapted to search for anonymous response data responding to the anonymous user request 143 in the storage 140 comprised in the first control node 101. If the anonymous response data 145 are found within the storage 140, the first control node 101 transmits the anonymous response data 145 to the intermediary node 105. The intermediary node 105 derives from the anonymous response data 145 response data 147 and transmits these via the communication channel 127 to the first user node 109.

The first user node may use the received response data 147 to decrypt content data 135 which have been provided from the second user node 111 to the first user node in an encrypted form. In particular, the response data 147 received from the intermediary node 105 comprise a decryption key for decrypting the content data 135 received in the encrypted form. The content data 135 are provided to the first user node within a transaction of a first transaction type.

In the illustrated embodiment the first user node 109 and the second user node 111 are connected to the same intermediary node 105. In other embodiments the first user node 109 and the second user node 111 may be connected to the different intermediary nodes.

When content data 136 being related to a transaction of a second type are provided to the first user node 109, the intermediary node 105 may transmit the anonymous user request 143 to the second control node 103 instead of transmitting the anonymous user request 143 to the first control node 101, since the second control node 103 may be the control node supporting anonymous response data related to transactions of the second transaction type.

In case the storage 140 of the first control node 101 does not contain the requested anonymous response data, the first control node 101 may be adapted to forward the anonymous user request 143 to a further first control node 102. In particular, the first control node 101 comprises a control node communication module 115 and the further first control node 102 comprises a control node communication module 117 for forming a first-level communication network 113, being in particular a private network between the first control node and the further first control node 102. Thereby the communication networks 113, 152 and 154 are separate from each other not allowing data transmission between different communication networks.

The further first control node 102 may be adapted to receive the anonymous user request 143 and to search within the storage 139 for the requested anonymous response data. If the anonymous response data are contained within the storage 139 of the further first control node 102 and if an access condition is satisfied (indicating that the further first control node 102 is allowed to enable access to the requested anonymous response data 145 to the first control node 101), the further first control node 102 transmits the anonymous response data 145 via the communication channel 119 of the first-level communication network 113 to the first control node 101. From there the anonymous response data are transmitted to the intermediary node 105 which derives therefrom the response data 147 (which are not anonymous and in particular not encrypted but may be personalized and in particular unencrypted) and transmits the response data 147 to the first user node 109. Further, other (in particular all) data exchanged between the intermediary node and a user node may be personalized (not anonymous) and in particular not encrypted. Further all communication between the intermediary node and a user node may be not encrypted.

The intermediary node 105 is further adapted to obtain a transaction history indicative of a history of transactions performed by the first user node 109, wherein in one embodiment the transaction history is stored within the storage 157 of the first intermediary node 105. Further, the intermediary node 105 is adapted to transmit a history report 156 to the first user node 109.

According to an embodiment, the intermediary node 105 transmits a (anonymous) history request 159 to the first control node 101 and/or to the second control node 103. The history request 159 may comprise an anonymous identification for the first user node 109. Upon receiving the history request 159 the first control node 101 and/or the second control node 103 may collect or assemble history data and may transmit a (anonymous) history response 161 to the intermediary node 105. Based on the history response 161 and/or based on history data comprised within the storage 157 the intermediary node 105 may assemble or generate the history report 156 and may transmit the history report 156 to the first user node 109.

According to an embodiment, the first control node 101 and the further first control node 102 may be located in different jurisdictions, in particular spaced apart by a distance between 100 km and 20000 km.

According to an embodiment, the first control node 101 may store anonymous response data within the storage 140 which are to stay within a particular political region or geographical region. According to an embodiment, the second control node 103 may store anonymous response data in the storage 135 which are to stay within another political region or geographical region.

Figure 2:
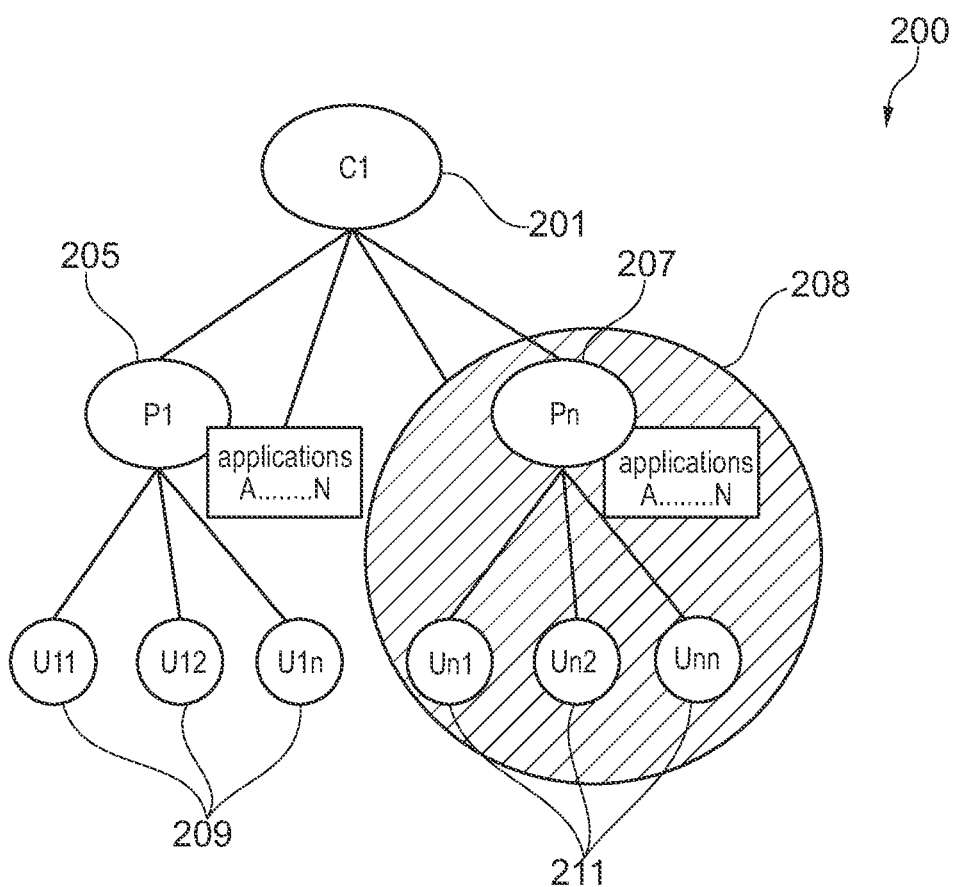
FIG. 2 schematically illustrates a conventional communication network.

FIG. 2 schematically illustrates a communication network according to findings by the inventors. Herein, a single control node or clearing node 201 is communicatively coupled to several providers 205 and 207 to which a plurality of user nodes 105 and 111 are connected, respectively.

Today's multi-provider communication systems may have limitations. Referring to FIG. 2 many of today's communication systems may be multi-provider systems. Multiple providers (P1, Pn) offer the same communication services (A, . . . N) or a subset of such services, e.g. A only. Users (Uxy) may register with one of the providers and then use such service via the chosen provider (Px). Users may be humans but could also be computer programs. A synchronization node C1 (control node or clearing facility) 201 enables communication across providers 205, 207, i.e, independent of the provider that a user may choose, users can communicate with each other, i.e, collaborate and use the same application (application A, . . . , N) and/or service. For security-sensitive applications, users will select a trusted provider, as using such application (or app) X may require sharing information with selected provider, whereas other providers 205, 207 and control node C1 (201) shall only have restricted access or no access at all to information of user Uxy. The illustration in FIG. 2 shows the concept of such multi-provider systems. An example is regify with application (or app) A "trusted and binding e-mail", and applications (or apps) B, . . . N could be other digital postal services.

Region 208 denotes a TRUST relationship region (not a geographical region) between provider Pn (207) and its users (211)

While such multi-provider system with central clearing C1 as illustrated in FIG. 2 offers choice for the users and reach due to the availability of multiple providers, it has its limitations for specific applications or apps.

The purpose of embodiments of this invention of a federated clearing and metering system is to resolve the following issues and limitations:

1. Sensitivity of an app SCx may contradict the concept of a central clearing

2. Network latency supports the concept of decentralized clearing as transactions can be processed more efficiently and faster "closer to home" with distributed clearing 3. Central clearing leads to the danger of a "single point of failure". In contrast, distributed clearing improves availability and reduces risks of failure.

4. Multi-app capabilities require flexibility to choose the clearing constellation on app level. In case, users use more than one app, it becomes likely, that a central clearing infrastructure and even a dedicated distributed one, will lack the flexibility required. Whereas a specific app may have to be operated on a dedicated clearing facility A, another specific app may be excluded from facility A. As clearing setups may differ from app to app, clearing must be determined on app level.

5. A user can be connected to the network independent of his actual communication profile. If there was a federated clearing setup that allowed a user/provider to flexibly include/exclude clearing constellations and avoid hard-wired clearing setups on app level, he would be connected to the whole network and still, provider/user could control clearing on the granular level of the app.

6. Central metering may be inappropriate or inefficient. One app may be metered on the basis of "number of users/period", whereas another may by "number of transactions/period". Federated clearing furthers specialization of clearing services, thereby improving efficiency including that for metering.

7. In the future, e-commerce transactions may have to be metered on app level, on provider level, and on the level of sovereign countries, e.g. in order to support VAT and other tax or compliance regimes.

Sensitivity of a particular application may contradict central clearing according to findings of the inventors.

Figure 3:
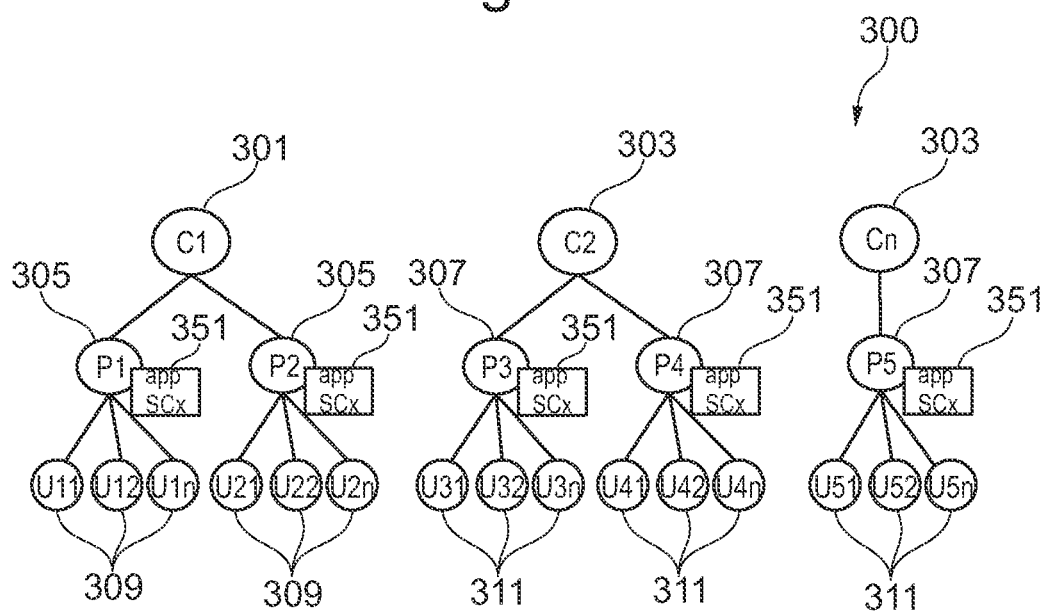
FIG. 3 schematically illustrates a communication network according to findings by the inventors.

FIG. 3 shows disconnected user groups in case of decentralized clearing with a purely central clearing approach according to findings by the inventors. Herein, a first clearing node 301 and two second clearing nodes 303 are provided, wherein each clearing node 301, 303 is connected to one or more provider nodes 305 and 307, respectively. Associated with the providers 305, 307 are a number of applications 351.

Referring to FIG. 3, one group of users (309) may accept that app SCx is centrally enabled by Cx, while another group (311) may not accept this. If e.g. C1 was located in the European Union, EU users may accept this, while non-EU users may not consider this acceptable. In particular in cases where the clearing facility stores keys or other transactional information (example: SWIFT), jurisdiction and therefore access may become critical. If C1 was relocated to another country or governance changed otherwise, another set of users may disagree. Consequently, for reasons of global acceptance, the clearing facility may have to be decentralized in order to serve the specific user requirements as otherwise, the restrictions of a purely central approach to clearing would lead to dedicated (fairly inefficient) setups of the complete clearing infrastructure as illustrated in FIG. 3. Besides adding cost, such setup would also limit reach as for example, user U41 is not connected to user U11 and could not communicate with him. Therefore, user U41 would have to register twice in such case.

Figure 4:
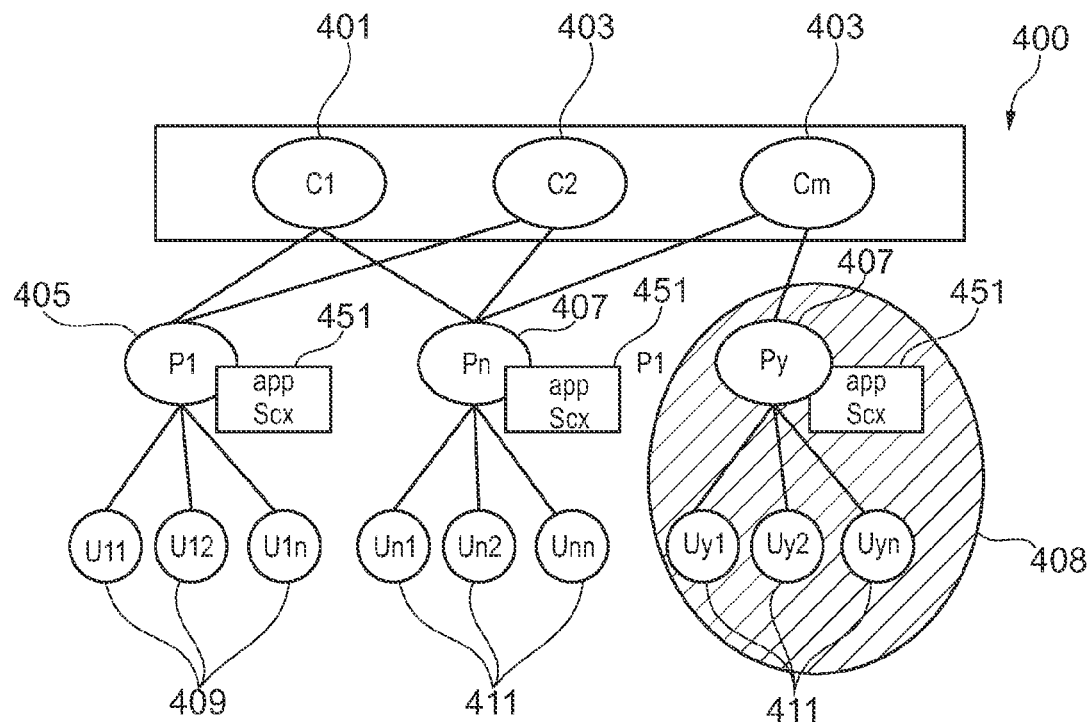
FIG. 4 schematically illustrates a communication network according to findings and considerations by the inventors.

FIG. 4 schematically illustrates a federated clearing system according to findings by the inventors, which may be regarded as an extension of the system illustrated in FIG. 3. In particular, the FIG. 4 illustrates the new flexibility for users brought about by a federated clearing system for app SCx:

User Group (Uyx) will only use the clearing facility Cm for app SCx

User Group (U1x) will use the clearing facilities C1 and C2 for app SCx

User Group (Unx) will use the clearing facilities C1, C2 and Cm.

Therefore, individual users can choose their preferred clearing constellation. Also, on the level of organizations (user groups), an appropriate provider setup (e.g. Py) may ensure that the clearing setup can be chosen. Consequently, providers will benefit, if they can set up an app with the clearing constellation. In case of Pn, a provider that leverages the clearing infrastructure to its fullest, may simply leave the decision where to clear to the clearing organizations (e.g. based on traffic).

Alternatively, choosing the sequence (C2, Cm, C1) will give such provider additional steering means. In this example C2: first, Cm: 2nd (if C2 is unavailable), C1: 3rd priority.

As illustrated in FIG. 4, dedicated services may be offered (Py, Cm) that can be restricted and controlled down to clearing/provider level—and still connection to the global communication network may be maintained. For example, a country could run eGovernment services in a fully controlled manner (Cm=clearing operator chosen by this country; Py=provider chosen) and still, access to the communication network may be ensured. The federated clearing system as illustrated in FIG. 4 also reduces the risks associated with the danger of a single point of failure.

Further, Multi-application capabilities may require federated clearing.

Figure 5:
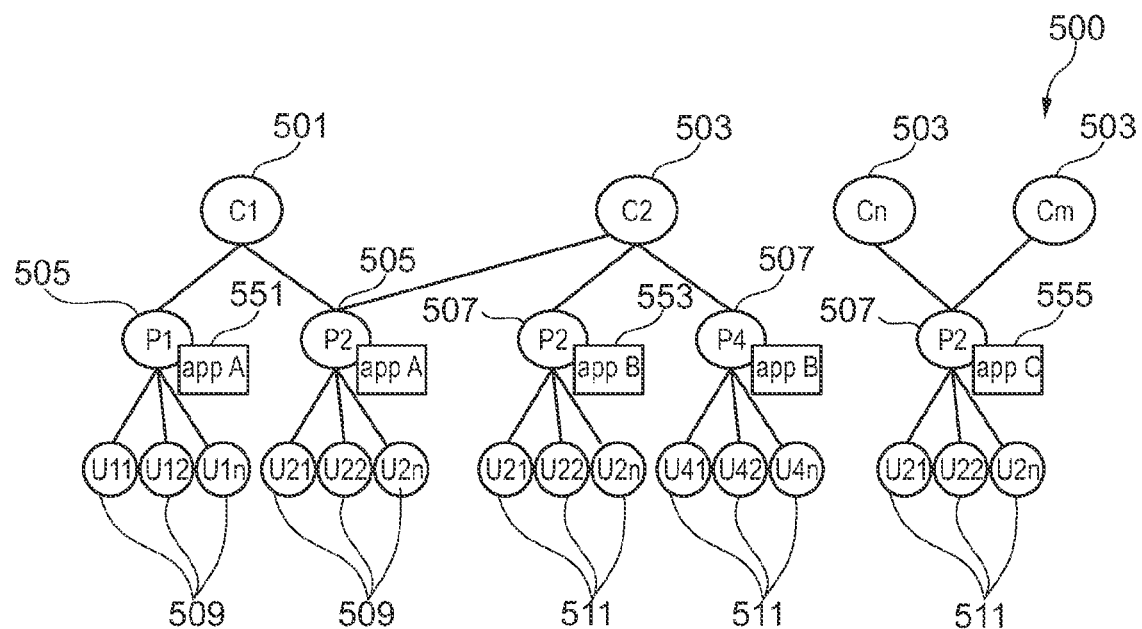
FIG. 5 schematically illustrates a communication network according to findings and considerations by the inventors.

What in terms of decentralized, dedicated clearing could (with some overhead) be achieved on the level of a single app, becomes outmost challenging in a multi-application world in which apps may require specific clearing constellations. The following example of FIG. 5 illustrates this challenge for provider P2 with three distinct apps A, B and C, that shall be cleared by clearing facilities C1/C2, C2 and Cn/Cm respectively. It becomes obvious that, compared to the system according to an embodiment of the present invention illustrated in FIG. 1, such setup would require significant overhead with still limited redundancy and little flexibility.

FIG. 5 schematically illustrates a communication network 500 according to findings by the inventors, wherein a number of different applications 551, 553 and 555 are provided by the provider nodes 505 and 507.

The concept of federated clearing applied to above scenario illustrated in FIG. 5 facilitates P2's job within one single multi-cleared multi-provider system. Benefits may be: improved redundancy, clearing setup on application level, users are part of the whole network, clearing rules on app level allow a user and/or a provider to determine the clearing setup for each app. Local regulations can be effected down to the level of the individual app.

Figure 6:
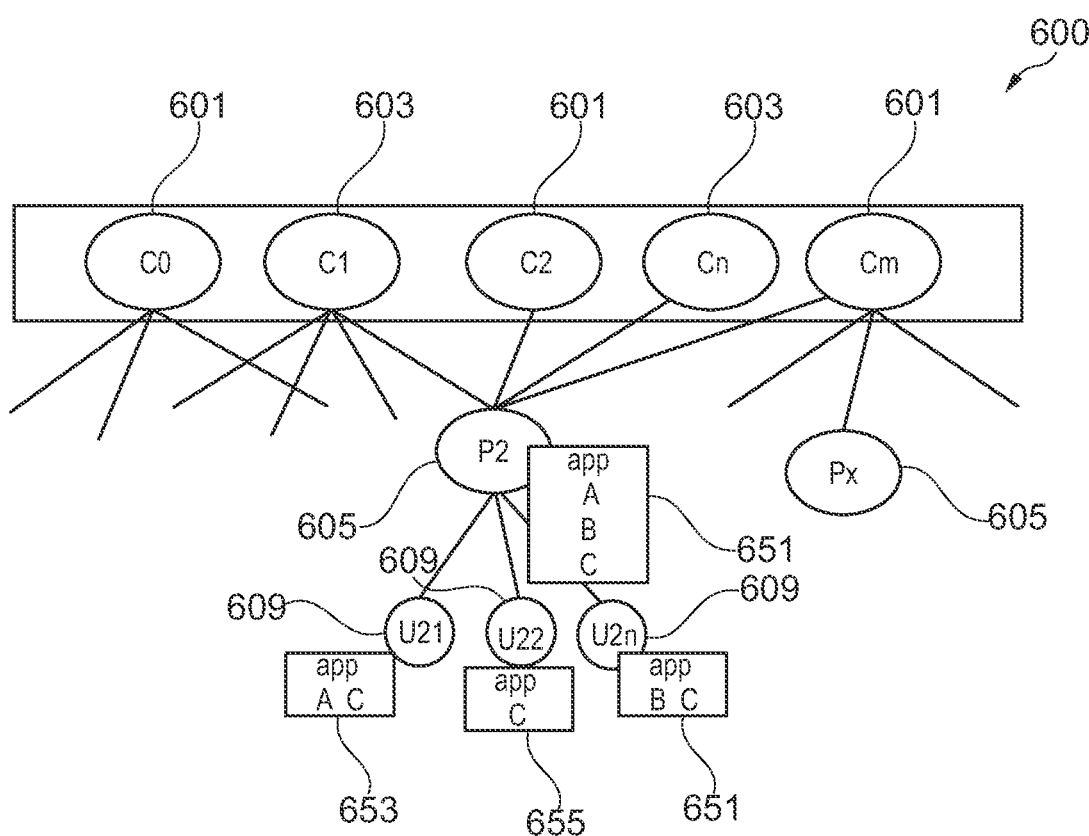
FIG. 6 schematically illustrates a communication network according to findings and considerations by the inventors.

FIG. 6 schematically illustrates a communication network or federated clearing system 600 according to findings by the inventors involving many-to-many relationships between intermediary nodes 605 and control nodes 601, 603. Herein, the provider node 605 provides a number of applications A, B, C, ... (labelled by reference sign 651) each user node 609 may select or choose from the available applications 651 to derive a subset 653 of the available applications 651. Further, each user 609 may choose clearing options specific for the selected application.

In FIG. 6 provider P2 offers a selection of apps. app A may be cleared at Cm only (e.g. government mandate), app B at C0 or C1 (e.g. EU or CH), and app C at any clearing facility (e.g., at the most efficient at a given point in time).

User U2n chooses the subset of apps from his provider's offering that user wants to use; only one account required for multi-app use. The user may also choose clearing options at app level, e.g. cleared in EU or CH or USA.

Such multi-application, multi-provider and multi-clearing environment illustrated in FIG. 6 may provide the highest flexibility possible and, while giving the user freedom to choice, it also satisfies requirements of providers with regards to local compliance, tax and regulations issues. The system illustrated in FIG. 1 achieves this goal.

Figure 7:
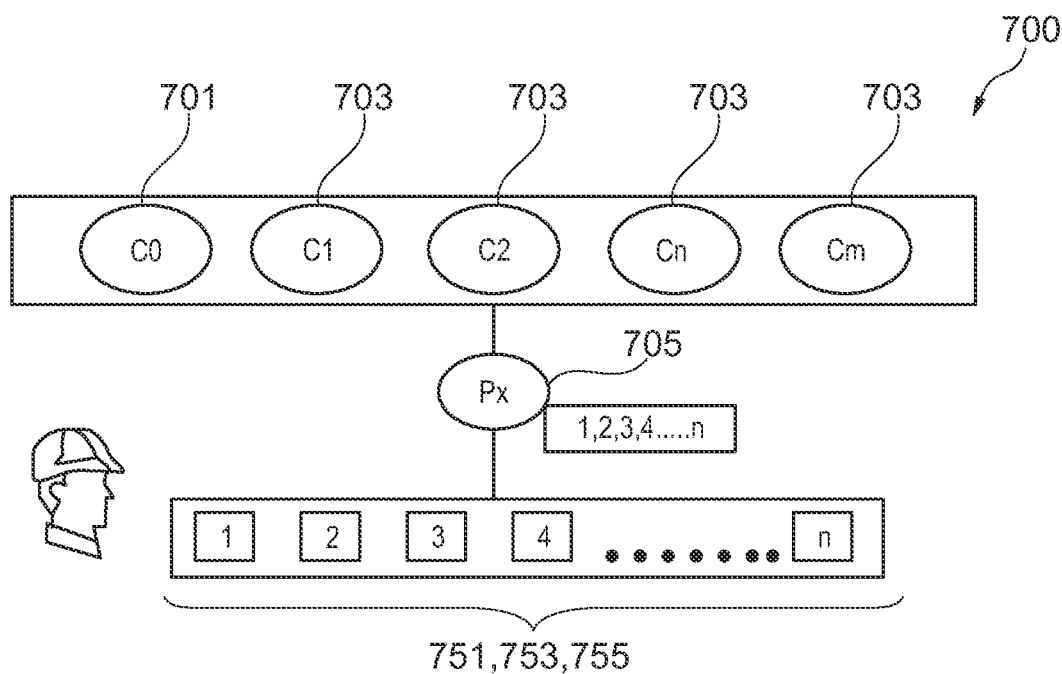
FIG. 7 schematically illustrates a communication network according to findings and considerations by the inventors.

FIG. 7 illustrates a user's multi-app selection (1 ... n) with only one account with one provider. Below some examples of applications 1, 2, 3, 4 as illustrated in FIG. 7 are listed:

app 1: eGov app regulated by the local government; may only be operated by local provider Px; clearing may only be done in local clearing facility Cm; service not offered elsewhere app 2: e-commerce purchase transaction; taxation may require clearing/metering in country x where service was consumed (Px) or in country y where service was produced (Py); or dual processing in Px Py, e.g. in case of specific cross-border taxation; app may be setup with respective parameters.

app 3: global mobile remittances with central clearing in order to register money transfer transaction and to certify validity of transactions. Governance may also require distributed clearing (e.g. EU, Asia, USA).

app 4: regify trusted and binding e-mail service; clearing may take place wherever provider chooses, e.g. 5 clearing facilities may offer the clearing service; provider Px may select facility 1 and 3.

FIG. 7 schematically illustrates a communication network 700 according to findings by the inventors. Herein, the control nodes 701, 703 may allow clearing or administering a plurality of applications 1, 2, 3, 4, ... n which are provided to a user node.

Figure 8:
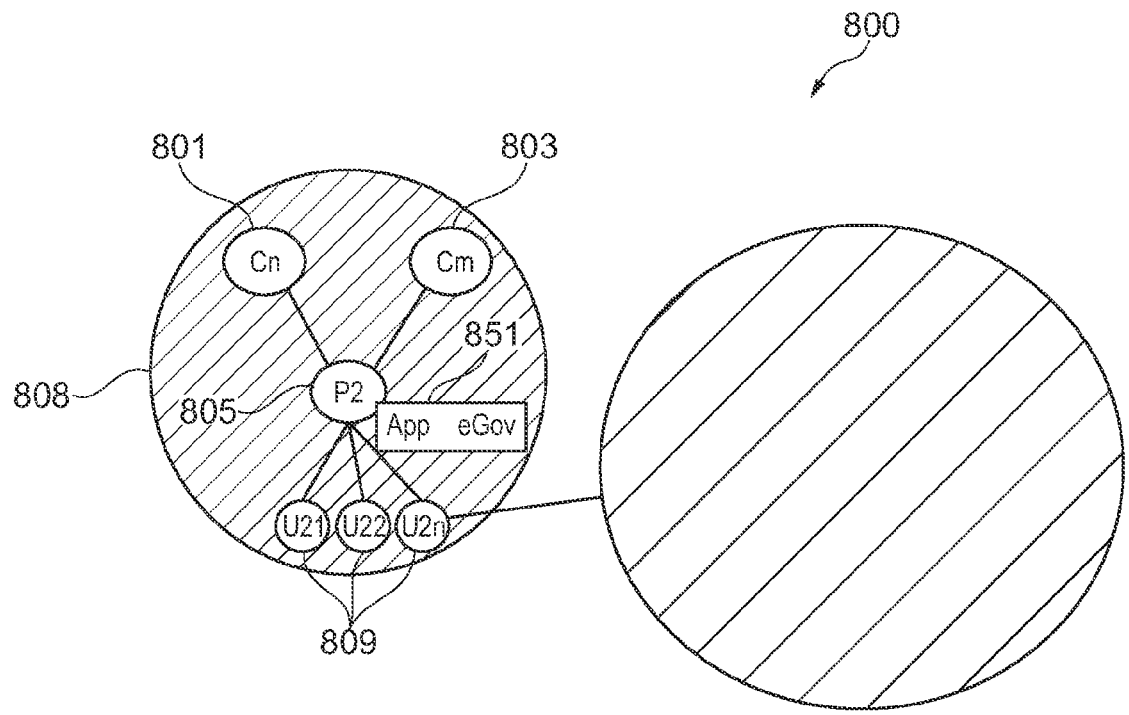
FIG. 8 schematically illustrates a communication environment according to findings and considerations by the inventors.

FIG. 8 schematically illustrates a trusted environment according to findings by the inventors. In particular, FIG. 8 illustrates an example of a dedicated service (eGovernment, e.g.), wherein a TRUSTED and SELF-SUSTAINING environment for dedicated eGov service and provider is established. Autarkic governance is provided, as both providers and clearing can be freely chosen by authorities. Still, users continue to be connected to the whole communication system, e.g. for other services with the same user account.

Figure 9:
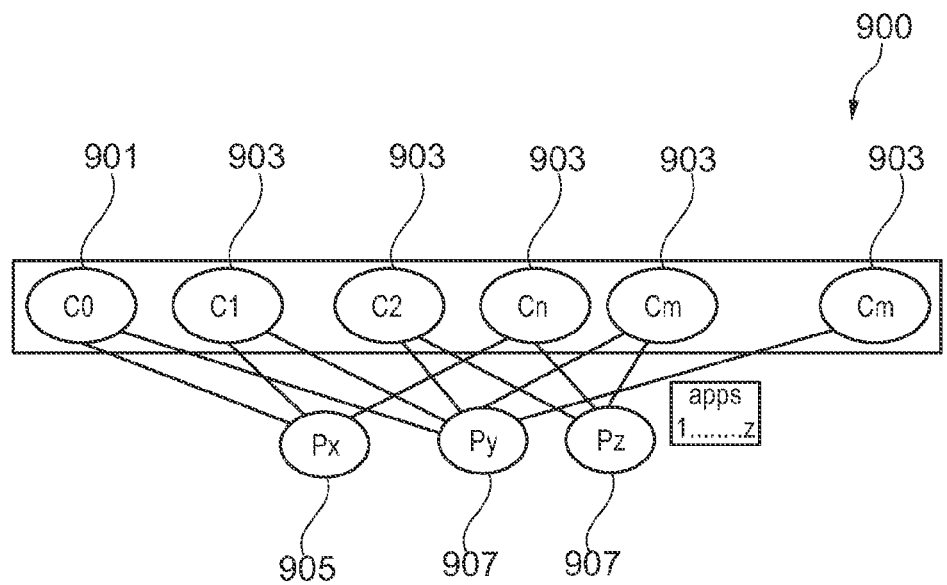
FIG. 9 schematically illustrates an architecture of a communication network according to findings and considerations by the inventors.

FIG. 9 schematically illustrates a communication network according to findings by the inventors, wherein plural control nodes 901, 903 are connected to plural provider nodes 905, 907.

Instead of hardwiring many-to-many connections between providers and clearing facilities (e.g. via VPNs) in order to get access to clearing data (e.g. keys of a regify transaction), a roaming process may be more flexible. FIG. 9 illustrates a multi-application communication system with federated but hard-wired clearing and metering.

Figure 10:
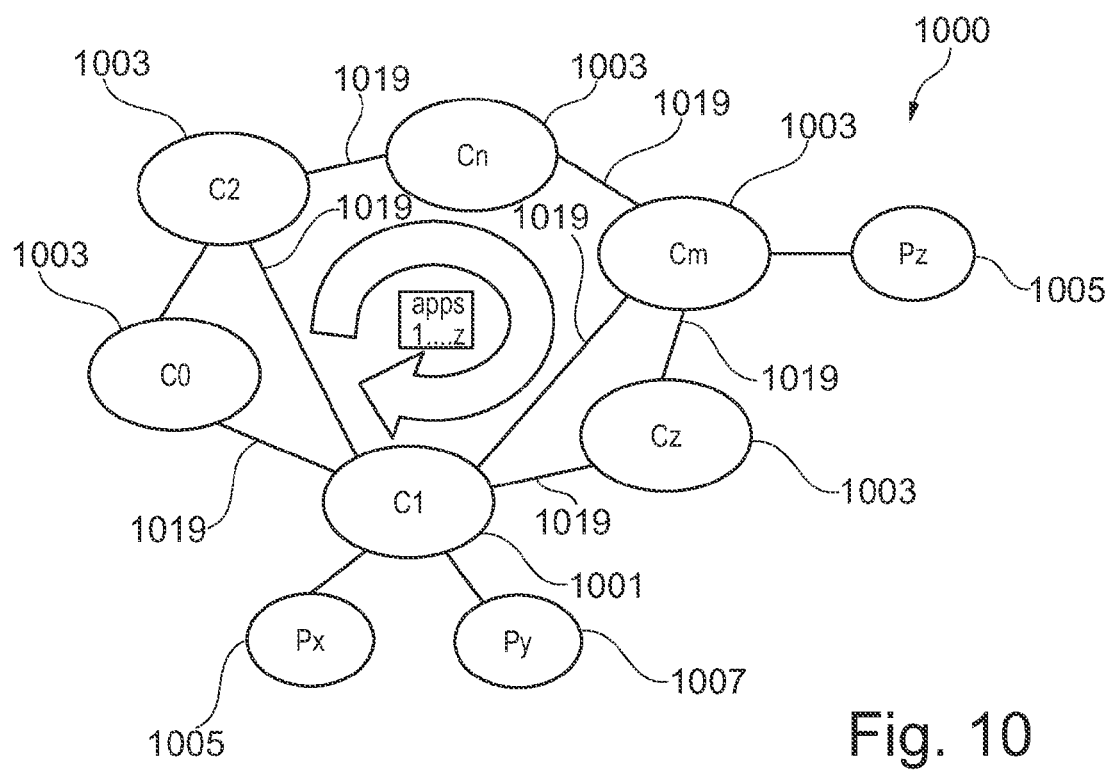
FIG. 10 schematically illustrates a communication network according to an embodiment of the present invention.

According to findings by the inventors, a roaming Architecture for federated clearing and metering is provided as illustrated in FIG. 10.

FIG. 10 schematically illustrates a communication network 1000 according to another embodiment of the invention. In particular, the communication network 1000 may also be considered as a roaming architecture for a multi-application communication system with federated clearing and metering, wherein the communication network 1000 comprises control nodes or clearing nodes 1001, 1003, wherein particular pairs of the control nodes 1001, 1003 form first-level communication networks providing communication channels 1019 between two control nodes 1001, 1003, respectively. In particular, each communication channel 1019 may represent a separate virtual private network. In particular, one or more user nodes may be communicatively coupled to the intermediary nodes 105 which are not illustrated for simplicity. User requests directed to the intermediary node 105 may be forwarded in an anonymized form to the control node 1001 which may forward or roam the anonymous request to another of the control nodes 1001, 1003 using the communication channel 1019. Thereby, the different control nodes 1001, 1003 may be located in different jurisdictions.

In particular, FIG. 10 illustrates a roaming architecture for multi-application communication system 1000 with federated clearing and metering. Thereby providers only need to be connected to one clearing service and the clearing services are connected as appropriate.

As the number of providers will outnumber that of clearing facilities for most of the apps, it may be appropriate to hardwire on the level of clearing facilities and connect providers through one clearing facility only and have a roaming dialogue in case the respective clearing facility does not have the required clearing information.

Still, a provider could be connected to more than one clearing facility, e.g. in case of dedicated services (e.g. eGov). Roaming may be defined as or comprise the searching, authentication and exchange process regarding clearing and/or metering information between clearing facilities. Roaming is effected whenever one clearing facility needs clearing information in order to process a transaction and this clearing information is stored/managed elsewhere, i.e. in another clearing facility.

Technically, the roaming process may rather be an "asynchronous call upon request" (near-real-time request) than a parallel request that would require high-speed connections and high-end technical infrastructure. Such call upon request would be more robust as well as it would work in heterogeneous environments, i.e. in a clearing federation with global clearing facilities under different governance rules. To give an example: in case, C1 will initiate a roaming call to C2 and Cz, such calls could be parallel or serial ones, e.g. call to Cz would only be initiated if call to C2 was unsuccessful.

Further, roaming capabilities may provide to enable various governance regimes.

In particular, roaming (in particular an access condition for roaming requests and/or forwarding response data) may be set up on different levels as listed under points 1. to 3. below:

1. User and User Group

A user/user group may determine to enable or disable roaming for a certain app A. If he chooses to disable roaming for app A and starts an app A transaction, then clearing data (keys, etc.) will reside at the clearing facility only where the user is registered. In case of "roaming disabled", the communication partner of that user will also have to be registered with the same clearing facility, because the clearing facility may not share data in case of "roaming disabled". This roaming setting guarantees that clearing data will always reside in the trusted domain that this user group has chosen. In contrast, "roaming enabled" enables a roaming dialogue between clearing facilities. In case, a user has multiple apps, some may be "roaming enabled" while others may be not.

2. Provider

Providers may be set up as "roaming enabled" or "roaming disabled". Latter setup option may be the choice of authorities that want to set up national eGovernment apps and must be in a position to solely control governance.

3. Clearing Facility

Clearing facility have the freedom to choose the set of clearing partners they want to roam with in order to exchange clearing data. Of course, this choice can either be made globally (for all apps that a clearing facility clears/meters) or for each app on an individual basis. As a result, a clearing facility can support a variety of apps with diverse clearing schemes. Whereas roaming may be disabled for an eGovernment app, selective roaming may be supported for app B, and full roaming for app C.

Figure 11:
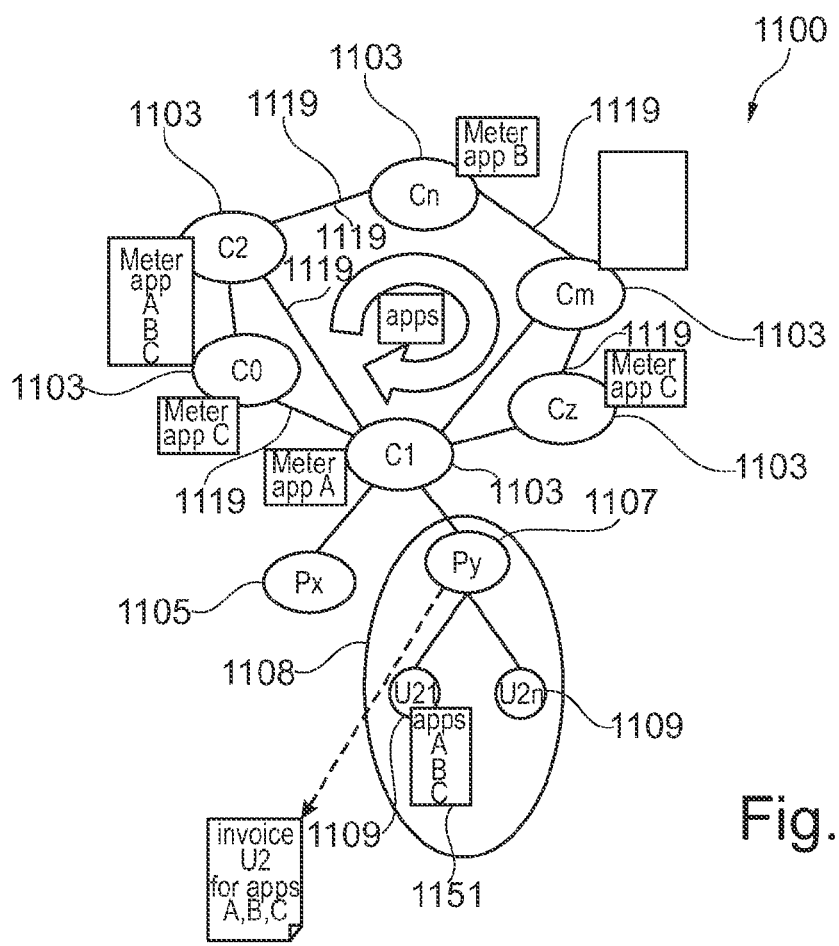
FIG. 11 illustrates a communication network according to an embodiment of the present invention.

Examples for roaming schemes down to the level of individual apps are given below:

Constellation for app B may be:
user A may choose "roaming disabled"
user B may choose "roaming enabled" (will only have an effect, if provider of user B enables roaming for app B)
provider 1 may pick clearing facilities 3 and 12 for app B roaming
provider 2 may choose "free roaming" and let some "most efficient" algorithm determine roaming process for app B Constellation for app C may be:
user B may choose "roaming disabled"
user A may choose "roaming enabled"
provider 2 may pick clearing facilities 1 and 12 for app C roaming (e.g. for legal reasons, technical reasons (latency) or other)
provider 1 may disable roaming for app C due to local regulations and legal issues
eGovernment app may be limited to dedicated provider and clearing facilities right from the outset FIG. 11 schematically illustrates another communication network 1100 according to an embodiment. The communication network 1100 illustrated in FIG. 11 differs from the aforementioned embodiments of a communication network in that it allows metering (i.e. measuring of data access, in particular for invoicing) of applications used by the user node or measuring or metering content requested and accessed by the user node.

In FIG. 11 federated anonymous metering is illustrated as a multi-application communication system with federated clearing and metering.

Federated clearing opens up opportunities for specialization of clearing services. This may also include metering. As clearing services may flexibly support all apps, a subset of apps, or only a dedicated one (e.g. eGov), metering can be decentralized as well as metering can be part of the clearing service. Typically, metering (and billing as the direct follow-on process) may consume significant resources and costs, in particular, if diverse metering concepts need to be supported in one central clearing instance. Metering of dedicated clearing instances reflects the specialization of respective clearing service and leads to efficient, distributed metering services.

Billing user U21 by provider Py may trigger a roaming dialogue in order to collect metering data from clearing facilities that may have served U21's requests within the billing period. Py may collect this usage data from the distributed meters individually per user, or for its complete user base. Advantages of this kind of federated, anonymous metering are manifold:

specialized clearing facilities can do the metering more efficiently metering data is anonymous on clearing level and may therefore reside anywhere (Asia, North America, EU, etc.) without affecting data privacy laws and regulations metering data will only become user-related on provider level (at level of trust relationship)

U21 has "one face to the customer" via Py

Py to own customer relationship

Py can consolidate metering data per app used into a billing statement for U21 roaming process for metering follows the roaming setup for clearing

Figure 12:
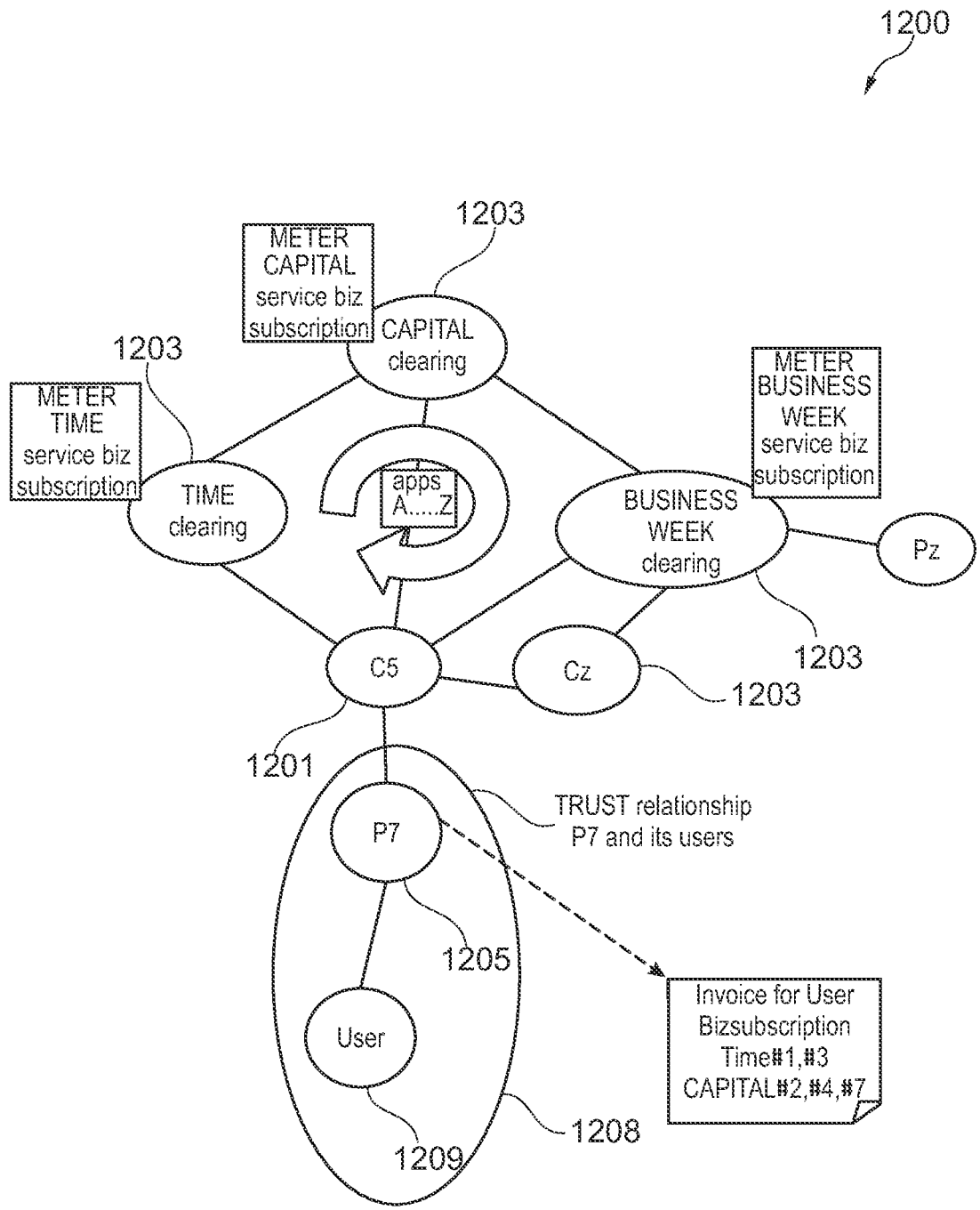
FIG. 12 schematically illustrates a communication network according to an embodiment of the present invention.

FIG. 12 schematically illustrates another communication network 1200 according to an embodiment of the present invention. Herein, a subscription on demand of a newspaper may be charged based on actual access to the particular newspaper content being accessed.

In particular, FIG. 12 illustrates an example for federated anonymous metering for subscriptions of content data.

Herein, a user for app "biz subscription" may receive a regify message in his inbox that contains digital contents as agreed between P7 and user in a subscription on demand service: a selection of articles from TIME Magazine, BUSINESS WEEK and CAPITAL. Articles may be available to the user as abstracts, and only upon confirming by clicking "if you want to read this article in full, you will be charged X Cents", the user will have access to the article(s) (that may be part of the regify message or shipped independently). The "biz subscription" service will register the purchasing requests, pass them on to the user's provider P7, that will anonymize the requests, pass them on to the clearing facility C5 (selection of clearing facility at the discretion of P7) that will effect roaming with clearing facilities of TIME, BUSINESS WEEK and/or CAPITAL respectively. These facilities will register the purchasing events, pass purchasing keys on and through the chain of clearing and providers, keys will make available requested digital contents to the user. The user expects and will receive one billing statement only from his trusted provider P7 of "biz subscription" app.

User may share his preferences with P7; profile may only be passed on by P7 anonymously and upon prior consent. Subscription services according to a user's profile across different content providers are superior for the user. Also, the user receives one billing statement only.

User may choose particular articles #1, #2, #3, #4, #7 in his "on demand" Biz subscription in the respective billing period. Provider P7 may act as the trusted intermediary and "Biz subscription Intermediary" vis-à-vis content owners.

It should be noted that the term "comprising" does not exclude other elements or features and the "a" or "an" does not exclude a plurality. Also elements described in association with different embodiments may be combined.

It should also be noted that reference signs in the claims shall not be construed as limiting the scope of the claims.

The invention claimed is:

1. An intermediary node, comprising:
    a first control node communication module adapted for forming a first communication network with a first control node;
    a second control node communication module adapted for forming a second communication network with a second control node, wherein the first communication network is communicatively separated from the second communication network; and
    a user node communication module adapted for forming a user communication network with at least one first user node and for receiving a user request from the first user node,
    wherein the intermediary node is adapted to generate an anonymous user request based on the user request and to perform a selection to transmit the anonymous user request selectively to the first control node or to the second control node,
    wherein the first control node communication module is adapted to receive anonymous response data from the first control node, wherein the second control node communication module is adapted to receive anonymous response data from the second control node, wherein the anonymous response data are indicative of a response to the user request,
    wherein the intermediary node is adapted to derive response data based on the received anonymous response data,
    wherein the response data comprise data to decrypt content data received previously by the first user node in an encrypted form.

2. The intermediary node according to claim 1, further comprising
    a determining section to determine whether the user request relates to a first transaction type or to a second transaction type,
    wherein the selection to transmit the anonymous user request to the first control node or to the second control node depends on whether the user request relates to the first transaction type or to the second transaction type.

3. The intermediary node according to claim 2, further comprising
    a storage storing a mapping table indicating an association of the first transaction type with the first control node and indicating an association of the second transaction type with the second control node,
    wherein the selection is based on the mapping table.

4. The intermediary node according to claim 1, wherein the selection to transmit the anonymous user request to the first control node or to the second control node depends on destination control node data comprised in the user request, the destination control node data being indicative of a destination control node of the anonymous user request.

5. The intermediary node according to claim 1, wherein the generated anonymous user request comprises a digital fingerprint of a transaction identification information identifying a transaction performed by the first user node.

6. The intermediary node according to claim 5, wherein the transaction involves an access to content data by the first user node, wherein in particular the content data comprise at least one of payment data, email data, content on demand data, video data and audio data.

7. The intermediary node according to claim 6, wherein the selection to transmit the anonymous user request to the first control node or to the second control node is based on a geographical location from where the content data originate and/or is based on a geographical location where the content data are supplied to.

8. The intermediary node according to claim 7, wherein the transaction involves running an application by the first user node, wherein in particular the application comprises at least one of an email application, a payment application, and a data access application.

9. The intermediary node according to claim 5, which is further adapted to obtain a transaction history report indicative of a history of transactions performed by the first user node, wherein the transaction history report is specific for the first user node.

10. The intermediary node according to claim 9, which is further adapted to generate, based on the transaction history report a usage message, wherein the user node communication module is adapted to transmit the generated consolidated transaction history report to the first user node.

11. The intermediary node according to claim 1,
    wherein the intermediary node is adapted to generate anonymous transaction-related data based on the transaction-related data and to perform a selection to transmit the anonymous transaction-related data to the first control node or to the second control node.

12. A communication network, comprising:
    an intermediary node according to claim 1;
    the first control node forming the first communication network with the intermediary node; and
    the second control node forming the second communication network with the intermediary node,
    wherein at least one of the first control node and the second control node is adapted to transmit an anonymous history response specific for the first user node to the intermediary node.

13. The communication system according to claim 12, wherein the first control node is located at a first control node location and the second control node is located at a second control node location, wherein the first control node location is spaced apart from the second control node location by a distance between 100 km and 20000 km, in particular between 300 km and 20000 km.

14. The communication system according to claim 13, wherein the first control node location is within a first jurisdiction region and the second control node location is within a second jurisdiction region different from the first jurisdiction region.

15. The communication system according to claim 12, further comprising
- a further first control node forming a first control node communication network with the first control node,
- wherein the first control node is adapted to transmit the anonymous user request received from the intermediary node to the further first control node, if the anonymous response data are not available at the first control node,
- wherein the further first control node is adapted to retrieve the anonymous response data and transmit the anonymous response data to the first control node, wherein the first control node is adapted to transmit the anonymous response data received from the further first control node to the intermediary node.

16. The communication system according to claim 12, wherein at least one of the first control node, further first control node, the second control node, the intermediary node, the first user node and the second user node comprises at least one of the group consisting of a server computer, a client computer, a desktop computer, a laptop computer, a personal digital assistant, and a mobile phone.

17. A communication method, comprising:
providing an intermediary node;
receiving, by a user node communication module of the intermediary node via a communication network formed between the intermediary node and at least one first user node, a user request from the first user node;
generating, by an intermediary node, an anonymous user request based on the user request; and
performing, by an intermediary node, a selection to transmit the anonymous user request selectively to a first control node or to a second control node,
wherein a first control node communication module of the intermediary node forms a first communication network with the first control node and
wherein a second control node communication module of the intermediary node forms a second communication network with the second control node, wherein the first communication network is communicatively separated from the second communication network,
wherein the first control node communication module is adapted to receive anonymous response data from the first control node,
wherein the second control node communication module is adapted to receive anonymous response data from the second control node, wherein the anonymous response data are indicative of a response to the user request,
wherein the intermediary node is adapted to derive response data based on the received anonymous response data,
wherein the response data comprise data to decrypt content data received previously by the first user node in an encrypted form.

18. A program element, which, when being executed by a processor, is adapted to control or carry out a method according to claim 17.

19. A computer-readable medium, in which a computer program is stored which, when being executed by a processor, is adapted to control or carry out a method according to claim 17.

* * * * *